United States Patent
Changey et al.

(10) Patent No.: US 7,957,899 B2
(45) Date of Patent: Jun. 7, 2011

(54) METHOD FOR DETERMINING THE ATTITUDE, POSITION, AND VELOCITY OF A MOBILE DEVICE

(75) Inventors: Sébastien Changey, Ensishem (FR); Volker Fleck, Saint-Louis (FR); Dominique Beauvois, Gif-sur-Yvette (FR)

(73) Assignees: Institut Franco-Allemand de Recherches de Saint-Louis, Saint-Louis (FR); Supelec, Gif-Sur-Yvette (FR)

( * ) Notice: Subject to any disclaimer, the term of this patent is extended or adjusted under 35 U.S.C. 154(b) by 347 days.

(21) Appl. No.: 12/285,776

(22) Filed: Oct. 14, 2008

(65) Prior Publication Data

US 2009/0182503 A1 Jul. 16, 2009

(30) Foreign Application Priority Data

Oct. 12, 2007 (FR) ...................................... 07 07161

(51) Int. Cl.
   *G01C 21/00* (2006.01)
(52) U.S. Cl. ..................................................... 701/220
(58) Field of Classification Search .................. 701/4, 7, 701/13, 18, 216, 220, 221, 226; 702/94–96, 702/141–142, 150–153
   See application file for complete search history.

(56) References Cited

U.S. PATENT DOCUMENTS

| 6,061,021 | A | 5/2000 | Zibell |
| 6,853,947 | B1 * | 2/2005 | Horton .......................... 702/151 |
| 7,555,371 | B2 * | 6/2009 | Lebrun et al. ................... 701/11 |
| 2002/0008661 | A1 | 1/2002 | McCall et al. |
| 2005/0240347 | A1 | 10/2005 | Yang |

FOREIGN PATENT DOCUMENTS

EP 0 838 692 A1 4/1998

OTHER PUBLICATIONS

Grenon et al., Enhancement of the Inertial Navigation System for the Morpheus Autonomous Underwater Vehicles, IEEE Journal of Oceanic Engineering, vol. 26, No. 4, Oct. 2001, pp. 548-560.

* cited by examiner

*Primary Examiner* — Kim T Nguyen
(74) *Attorney, Agent, or Firm* — Oliff & Berridge, PLC

(57) ABSTRACT

A method is provided for determining the attitude, position, and velocity of a mobile device from knowledge of the direction of the earth's magnetic field in an absolute reference frame. Signals are supplied to a processing means for the signals by gyroscopic measuring means in three axes, accelerometric measuring means in three axes, and magnetic measuring means in three axes, where the measuring means are located on-board the device and according to three three-dimensional reference frames connected to the device reference frame.

7 Claims, 2 Drawing Sheets

METHOD FOR DETERMINING THE ATTITUDE, POSITION, AND VELOCITY OF A MOBILE DEVICE

BACKGROUND

The invention relates to the field of inertial navigation systems and relates in particular to an apparatus calculating the angular position (attitude) and spatial position of a flying device (missile, projectile, drone, etc) or non-flying device to be determined on-board relative to a ground reference frame.

Classically, inertial systems used in missiles and projectiles are based on the integration of rotational speeds and accelerations measured in flight. For accuracy, these methods require high-quality, and hence expensive, on-board sensors to limit noise and measurement bias. This is because successive integrations cause substantial drift in attitude angles and spatial coordinates.

On this subject, US Patent Application 2005/0240347 is known, which describes an inertial system having, in particular, a three-axis magnetometer, a three-axis gyrometer, and a three-axis accelerometer which operates in two modes:
- a "static" mode that involves measuring the direction of gravity,
- a more complex "dynamic" mode which begins by estimating errors, particularly those due to the drift of the various sensors before making a prediction, which is incompatible with real-time operation unless highly sophisticated sensors with very low drift, but also low reliability, are used.

SUMMARY

The goal of the invention is to propose an inertial system operating in dynamic mode in real time and requiring, at most, the use of magnetometers in three directions, gyroscopes in three directions, and accelerometers in three directions, and enabling a low-end sensor to be used, particularly one that may have alignment defects.

The solution provided is a method for determining the attitude, position, and velocity of a mobile device from knowledge of the direction of the earth's magnetic field in an absolute reference frame, and from the knowledge of gyroscopic measurement in three axes, accelerometric measurement in three axes, and magnetic measurement in three axes. These measurements are taken by measuring means located on-board the device and according to three three-dimensional reference points connected to the device reference point $O_dX_dY_dZ_d$, and characterized by comprising:
- a first step in which the attitude of the device is calculated at time K−1 from:
  - signals coming from the gyroscopic measuring means at time k
  - signals coming from the accelerometric measuring means at time k+1
  - the position and velocity of the device in the absolute reference point at time k
  - signals supplied by the magnetic measuring means representing the projection of the earth's magnetic field in the three-dimensional magnetic reference frame linked to the device,
  - possibly, calculating a prediction of the attitude of the device by a mechanical flight model,
- a second step in which the position of the device and its velocity in the absolute reference frame at time k+1 are calculated from:
  - the attitude calculated in the first step
  - signals coming from the accelerometric measuring means at time k+1
  - signals coming from the gyroscopic measuring means at time k
  - the position and velocity of the device in the absolute reference frame at time k
  - signals supplied by the magnetic measuring means representing the projection of the earth's magnetic field in the reference frame
  - possibly, calculating a prediction of the attitude of the device by a mechanical flight model.

"Model" is the a priori knowledge of the description of the device, namely its mechanical parameters and its aerodynamic coefficients.

The novelty of the invention consists of using a behavioral model of the device to be located angularly and spatially. Thus, the information supplied by the model enables the defects of the sensors to be calibrated and/or certain sensors to be dispensed with; thus, the provision of information from knowledge of the model enables the sensors and their defects to be calibrated and hence the accuracy of the estimates to be enhanced. In this way, low-cost sensors are sufficient for making the estimates. The usefulness of mastering the behavioral model of the device enables the sensors and methods to be ingeniously combined to estimate the sought-after data and also enables the sensor to be integrated directly, and the differential equations of the model to be integrated using sensors to make the estimation converge.

Ingenious combinations of these sensors, coupled with knowledge of the behavior of the device, by a model, enable the attitude and position of the device to be determined accurately.

Also, the use merely of gyroscopic measuring means in three axes, accelerometric measuring means in three axes, and magnetic measuring means in three axes is sufficient to determine the attitude and position of the device and hence its trajectory.

According to a particular feature, the first step includes a first substep consisting of determining at least one of the attitude angles, for example the roll angle, then a second substep consisting of determining calibration values of the gyroscopic and magnetic measuring means from the signals furnished by the magnetic measuring means representing the projection of the earth's magnetic field in the reference frame in the device and knowledge of the direction of the earth's magnetic field in an absolute reference frame then a third substep of calculating the attitude of the device at time k+1 from:
- signals coming from the gyroscopic measuring means (1) at time k
- the position and velocity of the device in the absolute reference frame at time k
- said calibration values.

According to one particular feature, the second step comprises a first substep consisting of calculating the magnetic envelope $\vec{H}_{env}$ of the signals of the magnetic measurements from the values of the attitude angles ($\alpha$, $\beta$, $\phi 2$) calculated by said first means at time k+1 and measurements made by the magnetometer of the projections of the earth's magnetic field in the magnetic reference frame of the device, a second substep consisting of determining the calibration values of the accelerometric measuring means from the calculated magnetic envelope $\vec{H}_{env}$ and knowledge of the direction of the earth's magnetic field in an absolute reference frame, then a third substep of calculating the position of the device and its velocity in the absolute reference point at time k+1 from signals furnished by the measuring means and the calculated calibration values.

According to one particular feature, the first and second steps are implemented by Kalman filters.

According to one particular feature that avoids the problem that some of the measuring means would fail, a method according to the invention includes a substep of calculating the estimated trajectory of the device from a behavioral model from its mechanical parameters, namely its mass, its caliber, and the profile of aerodynamic coefficients.

The present invention enables the drift of the gyroscopic and accelerometric measurements to be corrected by converging on a fixed reference point which is the direction of the earth's magnetic field. Thus, the invention enables the attitude and position of the device to be determined accurately and in real time from sensors (magnetometers, gyrometers, and accelerometers) that have limited performance, are mass-produced, and hence low in cost. Moreover, the invention enables the change in the characteristics of the sensors due to the effect of high stresses, such as those brought about when the missile is launched by the gun effect, to be corrected.

The question is thus, using only three low-cost sensors resistant to very high accelerations, of determining:
- the position x, y, and z of the device;
- the standard velocity and direction of this device;
- the attitude of the device around its velocity vector, represented by three angles;
- the global attitude of the device relative to the ground: three Euler angles.

Finally, a system equivalent to a GPS can be made by a low-cost system.

The invention proposes dynamic calibration of the sensors, meaning that the calibration factors and misalignments of the sensors are determined in flight after the launch.

The invention proposes the use of gyrometers and accelerometers solely for making a first estimate (prediction) and then, after integration, making a correction with the aid of magnetometer measurements. This operation is carried out by Kalman filters.

The invention proposes to use, to a large extent, constant-gain Kalman filters to make the solution extremely rugged. The low noise of the signals of the magnetic sensors enables this type of filter to be used.

The invention proposes demodulating the signals as they are processed. This reduces sampling frequencies. Moreover, this signal demodulation increases the performance of the filters and effects gains in accuracy.

The invention also proposes an alternative solution if the gyrometer and accelerometer should fail, by using the behavioral model.

The invention withstands very high accelerations, on the order of magnitude of accelerations experienced by shells when launched.

The full system does not require expensive technology: a few low-cost sensors and an on-board computer with classical performance for making the calculations.

BRIEF DESCRIPTION OF THE DRAWINGS

Other advantages and features will emerge from the description of one embodiment of the invention with reference to the attached drawings wherein.

DETAILED DESCRIPTION OF EMBODIMENTS

Figure 1:
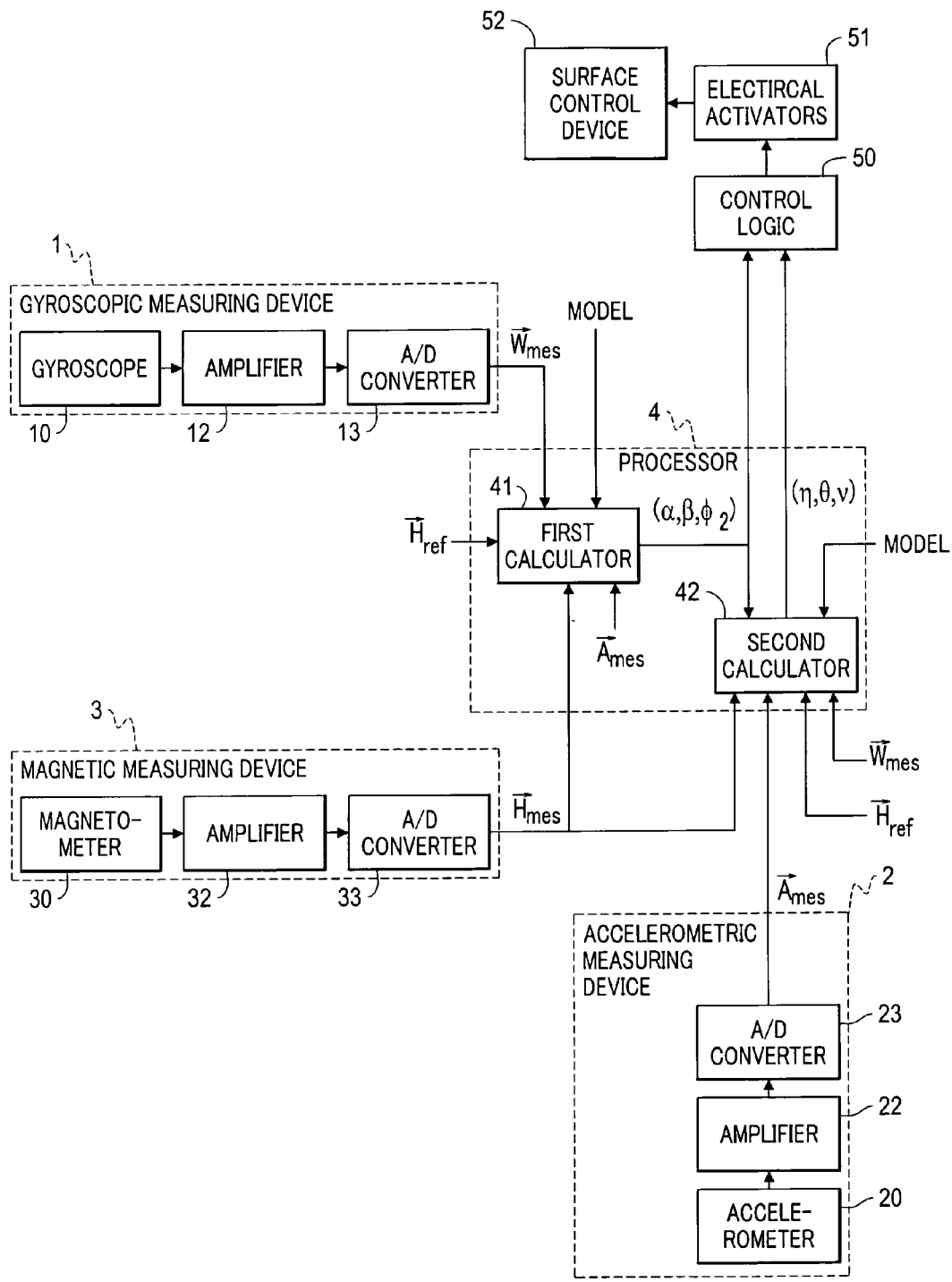
FIG. 1 is a diagram of the means implemented by the invention as well as the information flows entering and leaving the processing means.

FIG. 1 is a diagram of the means implemented by the invention as well as the information flows entering and leaving the processing means. In known fashion, these means include gyroscopic measuring means 1 in three virtually perpendicular axes, accelerometric measuring means 2 in three virtually perpendicular axes, magnetic measuring means 3 in three virtually perpendicular axes, and processing means 4 to process the signals coming from the gyroscopic, accelerometric, and magnetic measuring means 1, 2, and 3 respectively.

In this embodiment, the gyroscopic measuring means 1 have, in known fashion, a three-axis gyroscope 10, an amplifier 12, and an analog-digital converter 13. Similarly, the accelerometric measuring means 2 have a three-axis accelerometer 20, an amplifier 22, and an analog-digital converter 23. Similarly, the magnetic measuring means comprise a three-axis magnetometer 30, an amplifier 32, and an analog-digital converter 33.

The gyroscopic, accelerometric, and magnetic measuring means 1, 2, and 3 are disposed on a flying device in order to determine its attitude and position at all times. This flying device has surface control 52 and means for controlling their position comprising control logic 50 and electrical activators 51 connected to surface control 52.

The processing means comprise the first means 41 for calculating the attitude of the device at time k+1 from:
- signals coming from the gyroscopic measuring means at time k
- signals coming from the accelerometric measuring means at time k+1
- the position and velocity of the device in the absolute reference frame at time k
- signals supplied by the magnetic measuring means representing the projection of the earth's magnetic field in the three-dimensional magnetic reference frame linked to the device,
- and second means 42 for calculating the position of the device and its velocity in the absolute reference frame at time k+1 from:
- the attitude calculated in the first step
- signals coming from the accelerometric measuring means at time k+1
- signals coming from the gyroscopic measuring means at time k+1
- the position and velocity of the device in the absolute reference frame at time k
- signals supplied by the magnetic measuring means representing the projection of the earth's magnetic field in the reference frame.

In this embodiment of the invention, the first and second calculating means are comprised of Kalman filters.

Since one of the goals of the invention is to determine the attitude and position of a flying device relative to the ground, the rotational speeds, accelerations, and earth's magnetic field projections are measured by said measuring means 1, 2, 3 relative to reference frames linked to the device.

Since the absolute direction of the earth's magnetic field relative to a fixed ground reference frame $O_G X_G Y_G Z_G$ is known, an algorithm employed by processing means 4 and based on several Kalman filters enables real-time estimating of all the coordinates necessary for navigation, namely:

the position x, y, and z relative to the firing location, the velocity vector magnitude and direction: this vector is tangential to the device trajectory; its direction is determined by two angles ($\eta$, $\theta$) or its components $v_x$, $v_y$, $v_z$ in the absolute reference frame $O_G X_G Y_G Z_G$. Known formulas enable the two angles ($\eta$, $\theta$) and the norm v to be derived from these three components $v_x$, $v_y$, $v_z$: ($\eta$, $\theta$, v) $\leftrightarrow$ ($v_x$, $v_y$, $v_z$), the attitude of the device around its velocity vector. This is commonly represented by there angles: $\alpha$ angle of attack, $\beta$ sideslip angle, and $\phi_2$ roll angle. There are other equivalent representations ($\phi$ precession, $\delta$ incidence, and $\phi$ roll angle): our system enables the attitude to be estimated in all the representations, since there are formulas for going from one representation to another. The ingenuity of the method resides in the very precise choice of the various representations to characterize the change in the movement of the device and hence the signals measured, the global attitude of the device relative to the ground: this is represented by the three Euler angles, which are combinations of the angles described above.

All these values are needed for a full description of the system in order to dissociate the inherent dynamics of the various movements. It is by acting on this decomposition that the various movements of the projectile are extracted.

The applicant employs this apparatus for the specific goal of guiding the devices; hence it is very important to make these estimates in real time to proceed with steering during the flight. Simple and robust methods are needed to be installed in the on-board systems.

The general principle of the method is based on the Kalman filter. This method of estimation consists of two steps:

first an initial estimate, called prediction, is determined by the existing knowledge of the device status at time k and knowledge of its change between times k and k+1;

then, by comparing the value of the earth's magnetic field relative to the reference frame in the device and measuring the projections of the earth's magnetic field on the three axes of the projectile at time k+1 with the three-axis magnetometer 30, the Kalman algorithm corrects the prediction errors to calculate the estimate.

Estimate=Prediction+Correction (measurement,prediction)

In the case of our invention, the correction is calculated relative to a fixed reference (the earth's magnetic field). Thus, contrary to currently existing navigation systems, all possible drifts due to calculations of predictions can be quantified and hence corrected.

The general algorithm is shown in FIG. 1 with the following notations:

$\vec{H}_{ref}$ designates the direction of the earth's magnetic field in the absolute reference frame;

$\vec{H}_{mes}$ designates the projections of the earth's magnetic field, measured on the three axes of the device;

$\vec{A}_{mes}$ designates the accelerometer measurements;

$\vec{W}_{mes}$ designates the gyrometer measurements.

This is a two-step algorithm materialized by two sub-blocks.

Initially, the first calculation means 41 determine the attitude estimate. This step is called attitude filtering. A combination of Kalman filters estimates the angles describing the attitude of the device ($\alpha$, $\beta$, $\phi_2$) around its velocity vector, from:

1) predictions calculated from the mechanical model and/or predictions calculated by integrating the rotational speeds $\vec{W}_{mes}$ measured around the three axes of the device by the gyrometer 10 (one can also ingeniously use the two methods in parallel);
2) measurements coming from the accelerometers;
3) the position (x, y, z) and velocity ($\eta$, $\theta$, v) of the device;
4) measurement of the projection of the earth's magnetic field on the axes of the magnetic reference frame of the device, as we know the direction of the magnetic field in the ground-linked reference frame.

This first filtering can itself be broken down into subfilterings, according to the dynamics of the projectile. Also, it is necessary to estimate the calibration factors dynamically, in flight, on the projectile. In the case of a highly gyroscoped projectile, the proposed method consists first of estimating the roll angle, then calibrating the sensors, then proceeding, in known fashion, to demodulate the measuring signals in order to extract the attitude.

Figure 2:
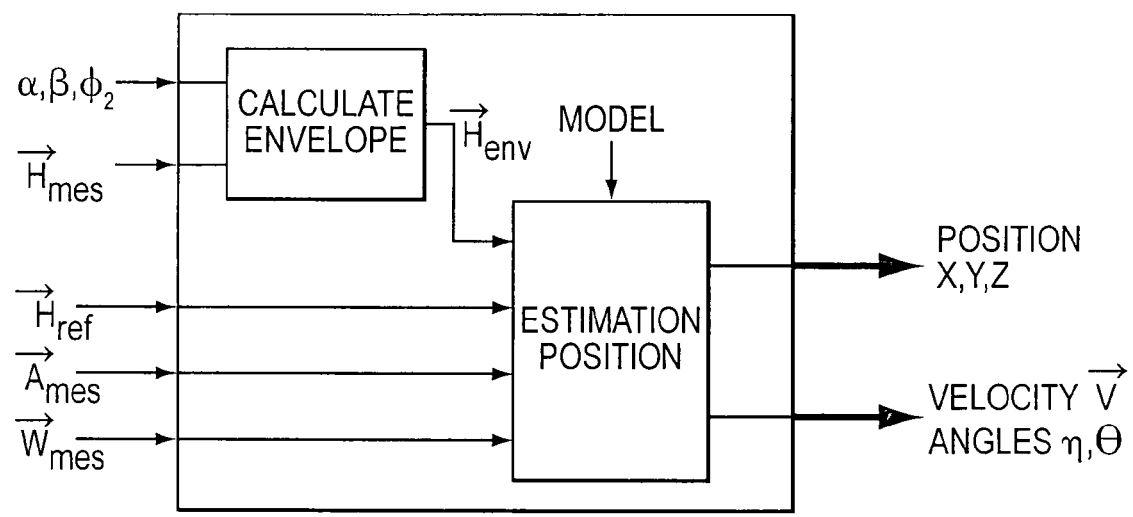
FIG. 2 is a chart representing the filter for position.

A second filtering, called position filtering, is carried out by the second calculation means 42. The flowchart for this filtering is shown in FIG. 2. It enables the velocity vector and position of the device to be estimated. These second means 42 first calculate the envelope $\vec{H}_{env}$ of the magnetic measuring signals from the attitude angle values ($\alpha$, $\beta$, $\phi_2$) calculated by first means at time k+1 and from measurements of the projections of the earth's magnetic field in the magnetic reference frame of the device. In fact, the point is to separate the slow component of the signals from the fast component. The slow component represents the movement of the trajectory.

The envelope $\vec{H}_{env}$ thus calculated accordingly represents a virtual measuring signal. The position estimate can then still be made using Kalman filtering, employing:

virtual measurement of the envelope of magnetic signals coming from magnetometer 30, as we know the direction of the magnetic field in the ground-linked reference frame, velocity and position predictions calculated from the mechanical model and/or using the $\vec{A}_{mes}$ information supplied by accelerometers 20.

We thus obtain a complete processing algorithm which, from a combination of several filters, enables all the information necessary for navigating the device to be extracted via the control logic 50, the activators 51, and the surface control 52. The attitude estimate is accurate within a degree for the three angles in the case of highly gyroscoped projectiles.

For the location estimate, the accuracy is about 1% for the coordinates and velocity.

The system can thus be used on board any vehicle, whether or not it is a flying device.

What is claimed is:

1. A method for determining attitude, position, and velocity of a mobile device from knowledge of a direction of earth's magnetic field in an absolute reference frame, signals supplied to processing means by gyroscopic measuring means in three axes, accelerometric measuring means in three axes, and magnetic measuring means in three axes, each of the measuring means being located on-board the mobile device and according to three three-dimensional reference frames connected to a mobile device reference frame $O_d X_d Y_d Z_d$, the method comprising:

a first step in which an attitude of the mobile device is calculated by the processing means at time K−1 from:
signals coming from the gyroscopic measuring means at time k;

signals coming from the accelerometric measuring means at time k+1;

a position and a velocity of the mobile device in the absolute reference frame at at time k; and signals supplied by the magnetic measuring means representing a projection of the earth's magnetic field in a three-dimensional magnetic reference frame linked to the mobile device, a second step in which the position and the velocity of the mobile device in an absolute frame point at time k+1 are calculated from:

the attitude calculated in the first step;

the signals coming from the accelerometric measuring means at time k+1;

the signals coming from the gyroscopic measuring means at time k;

the position and the velocity of the mobile device in the absolute reference frame at time k; and the signals supplied by the magnetic measuring means representing the projection of the earth's magnetic field in the three-dimensional magnetic reference frame.

2. The method according to claim 1, wherein the first step further comprises calculating a prediction of the attitude of the mobile device by a mechanical flight model.

3. The method according to claim 1, wherein the first step includes a first substep of determining at least one attitude angle, then a second substep of determining calibration values of the gyroscopic measuring means and the magnetic measuring means from the signals coming from the magnetic measuring means representing the projection of the earth's magnetic field in the reference frame and knowledge of the direction of the earth's magnetic field in the absolute reference frame, and then a third substep of calculating the attitude of the mobile device at time k+1 from:

signals coming from the gyroscopic measuring means at time k;

the position and the velocity of the mobile device in the absolute reference frame at time k; and the calibration values.

4. The method according to claim 1, wherein the second step further comprises calculating a prediction of the attitude of the mobile device by a mechanical flight model.

5. The method according to claim 1, wherein the second step comprises a first substep consisting of calculating a magnetic envelope $\vec{H}_{env}$ of signals of magnetic measurements from values of attitude angles ($\alpha$, $\beta$, $\phi_2$) calculated by first means at time k+1 and measurements made by the magnetic measuring means the projections of the earth's magnetic field in a magnetic reference frame of the mobile device, a second substep consisting of determining calibration values of the accelerometric measuring means from the calculated magnetic envelope $\vec{H}_{env}$ and knowledge of the direction of the earth's magnetic field in the absolute reference frame, then a third substep of calculating the position and the velocity of the mobile device in the absolute reference frame at time k+1 from the signals furnished by each of the measuring means and the calculated calibration values.

6. The method according to claim 1, wherein the first and second steps are implemented by Kalman filters.

7. The method according to claim 1, further comprising a substep of calculating an estimated trajectory of the mobile device from a behavioral model of mechanical parameters of the mobile device including mass, caliber an a profile of aerodynamic coefficients.

* * * * *